United States Patent [19]

Michalon et al.

[11] 4,066,161
[45] Jan. 3, 1978

[54] CHAIN WITH LINKS OF VARIABLE LENGTH

[75] Inventors: Daniel Michalon, Saint-Etienne; Pierre Rolin, Andreziux-Boutheon, both of France

[73] Assignee: Centre Stephanois de Recherches, Andrezieux-Boutheon, France

[21] Appl. No.: 485,215

[22] Filed: July 2, 1974

[30] Foreign Application Priority Data

July 2, 1973    France ............................ 73.25015

[51] Int. Cl.² ............................................ B65G 65/06
[52] U.S. Cl. .................................................. 198/334
[58] Field of Search .................... 198/16, 16 MS, 110, 198/334, 792; 104/25, 18, 20, 27, 28, 31

[56] References Cited

U.S. PATENT DOCUMENTS

| | | | |
|---|---|---|---|
| 3,462,002 | 8/1969 | Zuppiger | 198/110 |
| 3,485,182 | 12/1969 | Crowder et al. | 104/20 |
| 3,583,543 | 6/1971 | Angioletti | 198/16 MS |
| 3,601,246 | 8/1971 | Dubois | 198/110 |
| 3,672,484 | 6/1972 | Angioletti et al. | 198/16 MS |
| 3,712,448 | 1/1973 | Burson et al. | 198/16 MS |
| 3,881,423 | 5/1975 | Woods et al. | 104/25 |

*Primary Examiner*—Robert G. Sheridan
*Attorney, Agent, or Firm*—Irving M. Weiner; Pamela S. Austin

[57] ABSTRACT

The invention relates to a variable pitch conveyor or a chain in which the length of the links can be varied.

Each link includes a cross-bar $T_i$ mounted between longitudinal rocking bars $B_i$ that are interconnected by linked bars $L_i$. The bars $B_i$ are integral with a toothed sector which controls the rocking of the bars by meshing with a moving rack adapted to follow, with a variable speed, the motion of the chain.

25 Claims, 22 Drawing Figures

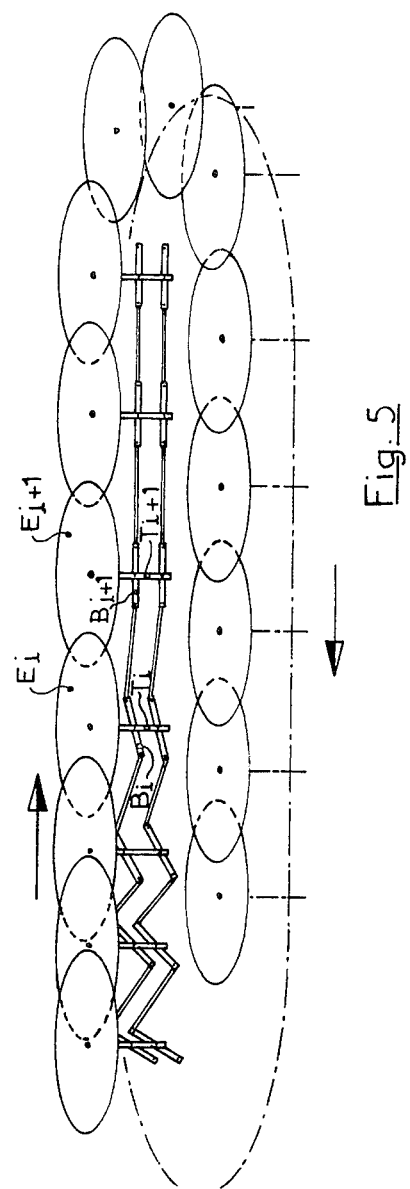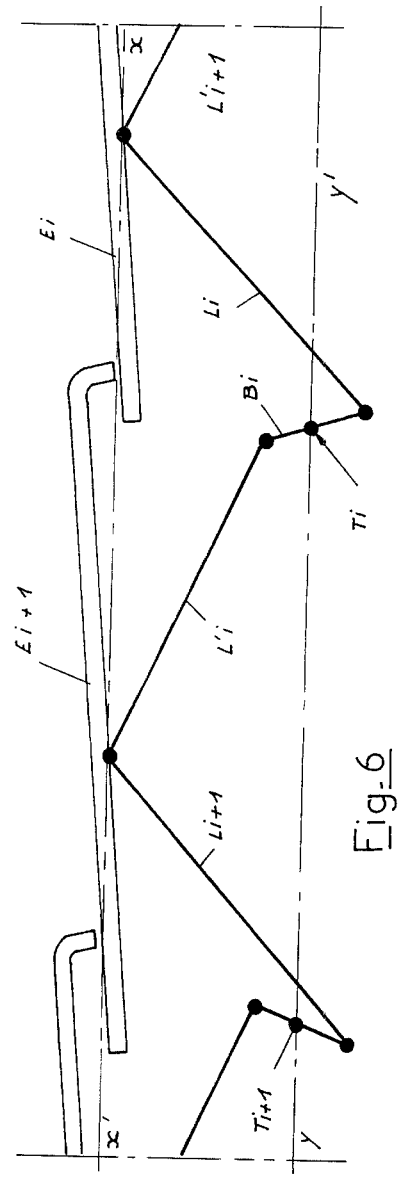
Fig. 5
Fig. 6

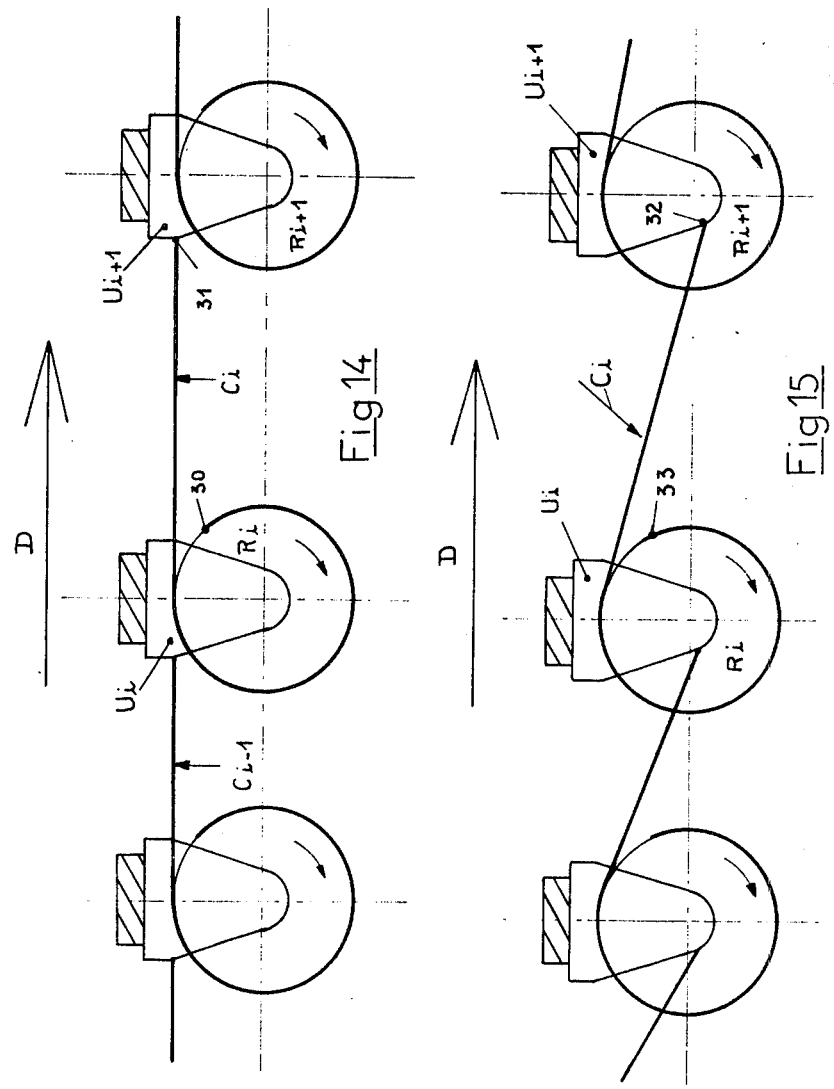

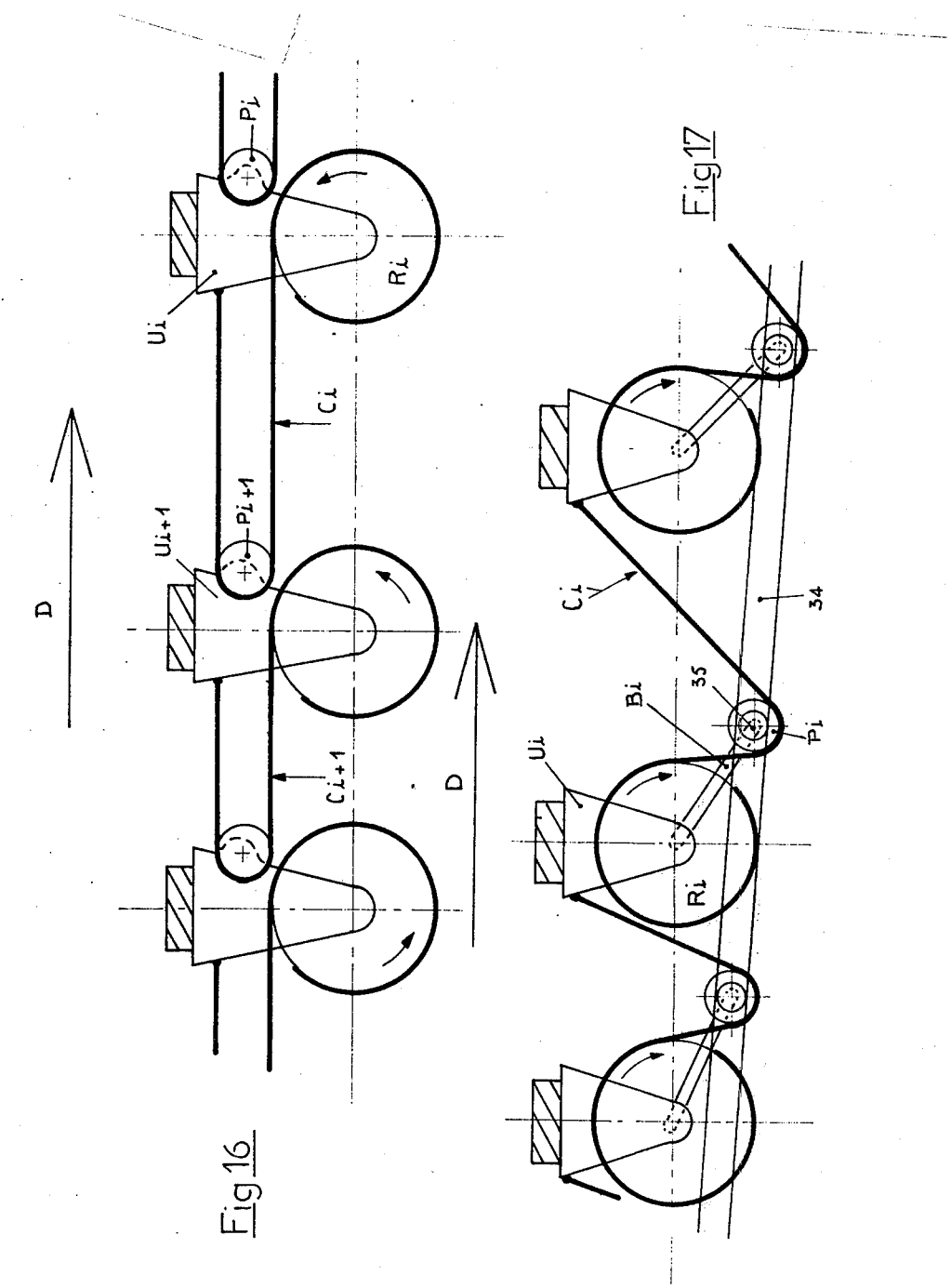

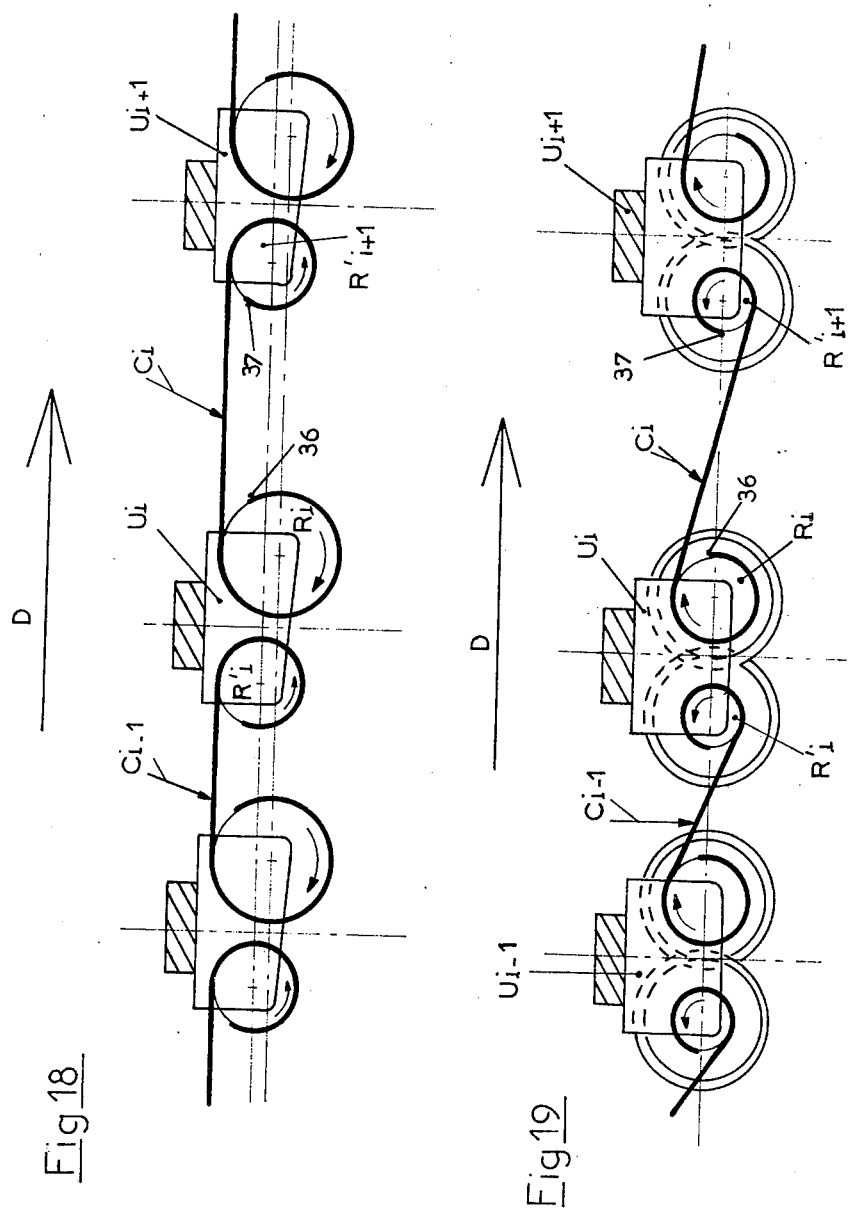

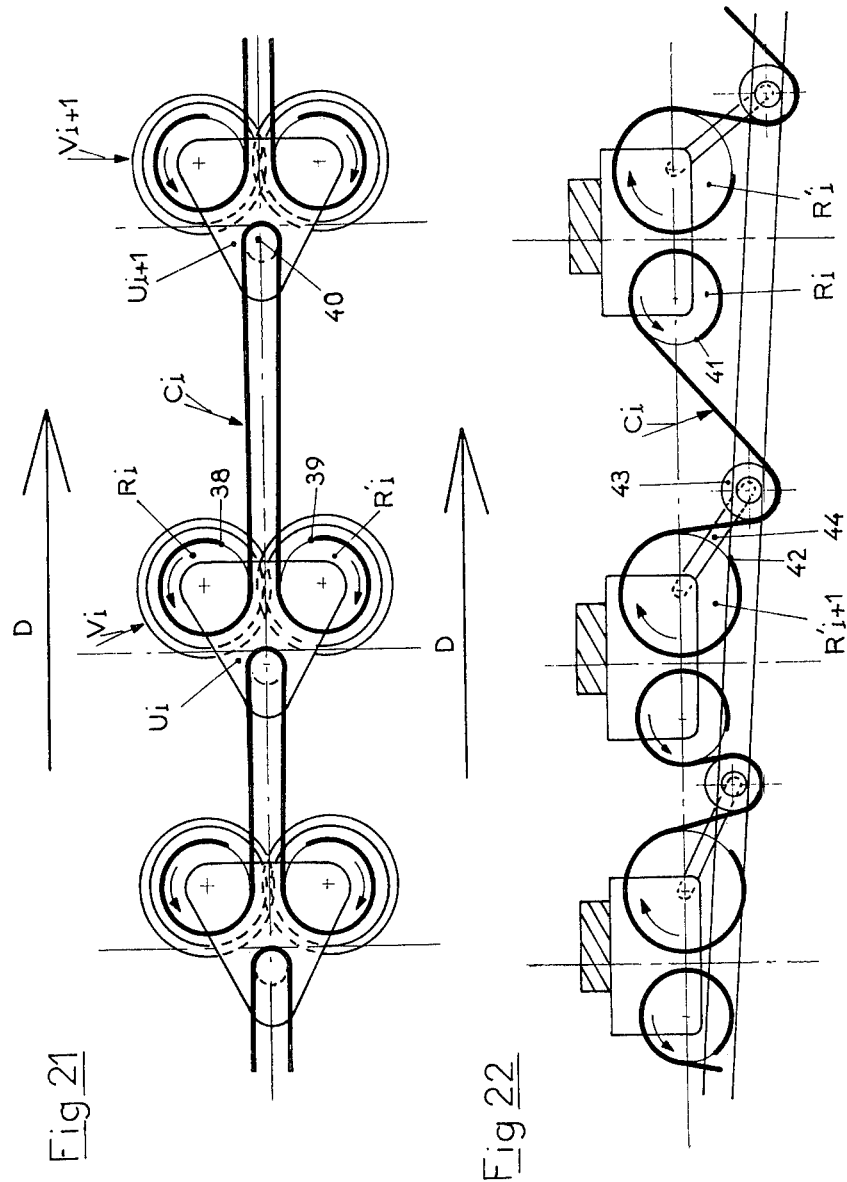

4,066,161

CHAIN WITH LINKS OF VARIABLE LENGTH

The present invention relates to a conveyor or chain, the length of the links of which can be varied.

BACKGROUND OF THE INVENTION

There are various applications which require the use of such a conveyor or chain, such as, for instance, continuous transport mechanisms wherein an endless chain is used, the variable length links of which allow accelerating the transport speed in some zones, while reducing said speed in other zones.

This principle is used, in particular, in speeding up systems for pedestrian movement, or escalators, which are continuous conveyors upon which pedestrians step. If the endless chain of the conveyor includes variable length links, it will be possible to accelerate the rate of motion of the pedestrians in the zones where a suitable arrangement increases the length of the links. In this case, certain elements of the chain are periodically made integral with a carriage, the latter generally carrying combs.

Most of the known systems for obtaining accelerating or decelerating arrangements are heavy, complicated, and cumbersome. Moreover, said systems cannot be wound, that is, the plane defined by the transport surface of the links is necessarily perpendicular to the return axes located at both ends of the system. This prevents obtaining systems which take up little space with a view to provide, for instance, a handrail intended to accompany an escalator, which handrail should wind about end return axes perpendicular to the plane of transport, so that the return zone could be accommodated under the upgoing zone.

An object of the present invention is to obviate said drawbacks by providing a chain with links of variable length, the original design of which allows constructing it simply and with any dimensions whatever. In addition, the chain according to the invention and the control system therefor are able to wind about two end pulleys to form an endless circuit, the carrying surface of which is parallel to the axes of said pulleys. It can also be adapted to an arrangement of the "roundabout" type, wherein the endless carrying surface is perpendicular to the axes of the pulleys.

SUMMARY OF THE INVENTION

The present invention provides a variable-pitch chain-like conveyor which comprises a series of first elements which move substantially parallel to a main path of travel and which are disposed substantially transverse to said main path of travel. The conveyor also includes a series of second elements each of which is movably connected through its central portion to at least one of said first elements, respectively. The conveyor also includes first means interconnecting each said second element to adjacent second elements in said series of second elements. The conveyor further includes second means operably and mechanically connected to said series of second elements for varying the orientation of said second elements during movement of said conveyor.

A chain or conveyor according to the invention includes transverse bars housed between two longitudinal rows of bars to define the links, and is characterized in that the longitudinal bars are of two types, to wit:

longitudinal rocking bars, each of which is linked through its central portion to a transverse bar, to which it is perpendicular, longitudinal connecting bars, while means are provided for varying the orientation of one or more pairs of longitudinal rocking bars during the motion of the chain.

In a first simple embodiment, the longitudinal connecting bars have each a first end linked to the adjacent end of a first rocking bar, and a second end linked to the adjacent end of a second rocking bar. In this case, if the chain is equipped with elements or carrying plates arranged for providing a transporting platform, said elements will be driven by means which connect each of them to one of the transverse bars about which the longitudinal rocking bars pivot. A link includes one rocking bar and one connecting bar, and, eventually, one element of the transporting platform, such as, for instance, a comb-carrying carriage.

In a second, more elaborate, embodiment, a longitudinal connecting bar has a first end linked to the adjacent end of a rocking bar, and a second end linked to the corresponding element or carrying plate of the transporting platform. In this case, a link includes one rocking bar, two connecting bars and, eventually, one carrying plate such as a comb-carrying carriage.

According to another feature of the invention, the second elements may be rigid, while the third elements may be either rigid or flexible, as the case may be. In this latter embodiment, the second elements may be constituted by one or more flexible ties, such as cables, chains, or any other known means.

According to another feature of the invention, the second means for varying the orientation of the rocking bars include at least one toothed sector integral with each pair of rocking bars, and at least one auxiliary endless chain having ordinary links, the latter defining a rack with which the toothed wheels or sectors of the corresponding portion of the rocking bars of the main chain mesh.

According to another feature of the invention, one side of the auxiliary endless chain defines a rack, which travels parallel to the corresponding portion of the main chain, but with a speed different from the mean local speed of said main chain.

BRIEF DESCRIPTION OF THE DRAWINGS

FIG. 5 is a view showing carrying plates of, for instance, the comb-carrying carriages, arranged perpendicularly to the transverse bars.

FIG. 6 is a diagrammatic side view showing a unit link which includes two rigid connecting bars.

FIG. 14 is a diagrammatic side view of a more elaborate embodiment, wherein each link includes two flexible connecting bars and one rocking bar of the reel or roller type.

FIG. 15 is an explanatory view corresponding to FIG. 14.

FIG. 16 shows a modification of the chain of the type with cables and reels, which includes a pulley for winding the cables.

FIG. 17 shows an improvement in the chain illustrated in FIG. 16.

FIG. 18 shows another embodiment with unsymmetrical reels.

FIG. 19 shows a further modified embodiment, wherein the connecting cables are wound unsymmetrically.

FIG. 21 shows a combination of several of the improvements illustrated in the previous figures.

FIG. 22 illustrates another combined arrangement, which is unsymmetrical.

DETAILED DESCRIPTION

Figure 1:
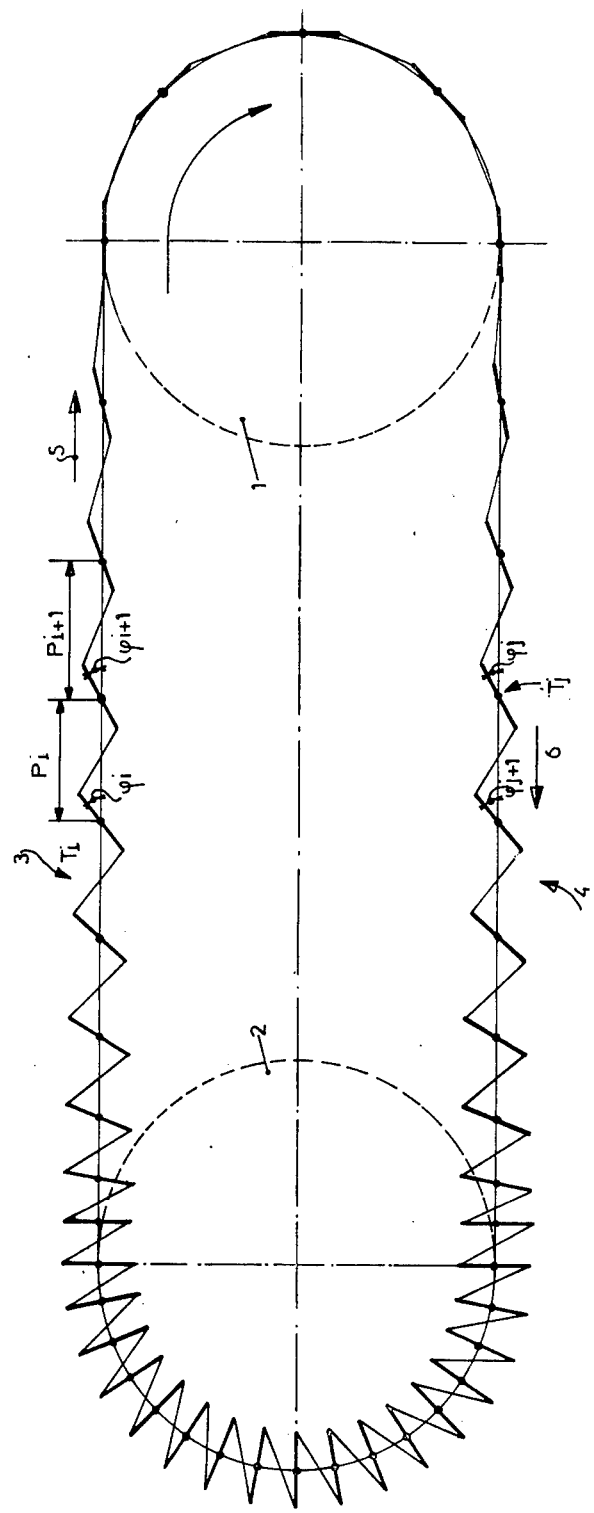
FIG. 1 is a diagrammatic view showing the general disposition of an endless chain with variable length links according to the invention, wherein the upper side is accelerated while the lower side is slowed down.

The conveyor or endless chain shown in FIG. 1 travels between two toothed wheels or pulleys, to wit:
a driving pulley 1,
a loose pulley 2.

Figure 3:
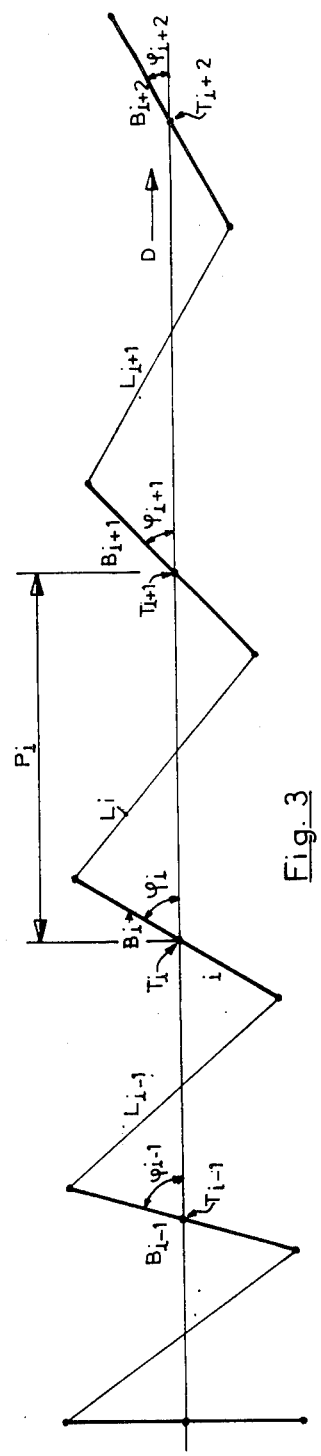
FIG. 3 is a diagrammatic side view showing the series of bars on a portion of the chain according to the invention.

In its simplest embodiment, the conveyor or chain includes a series of first elements, such as cross-bars $T_1$, $T_2 \ldots T_i$, $T_{i+1} \ldots T_n$. The ends of each cross-bar $T_i$ are each integral with a second element, such as a longitudinal rocking bar $B_1$, $B_2 \ldots B_i$, $B_{i+1} \ldots B_n$ (FIG. 3). Each end of a bar $B_i$ is connected to the adjacent end of the next bar $B_{i+1}$ by first means, such as third elements or linked connecting bars $L_1$, $L_2 \ldots L_i$, $L_{i+1} \ldots L_n$.

Figure 9:
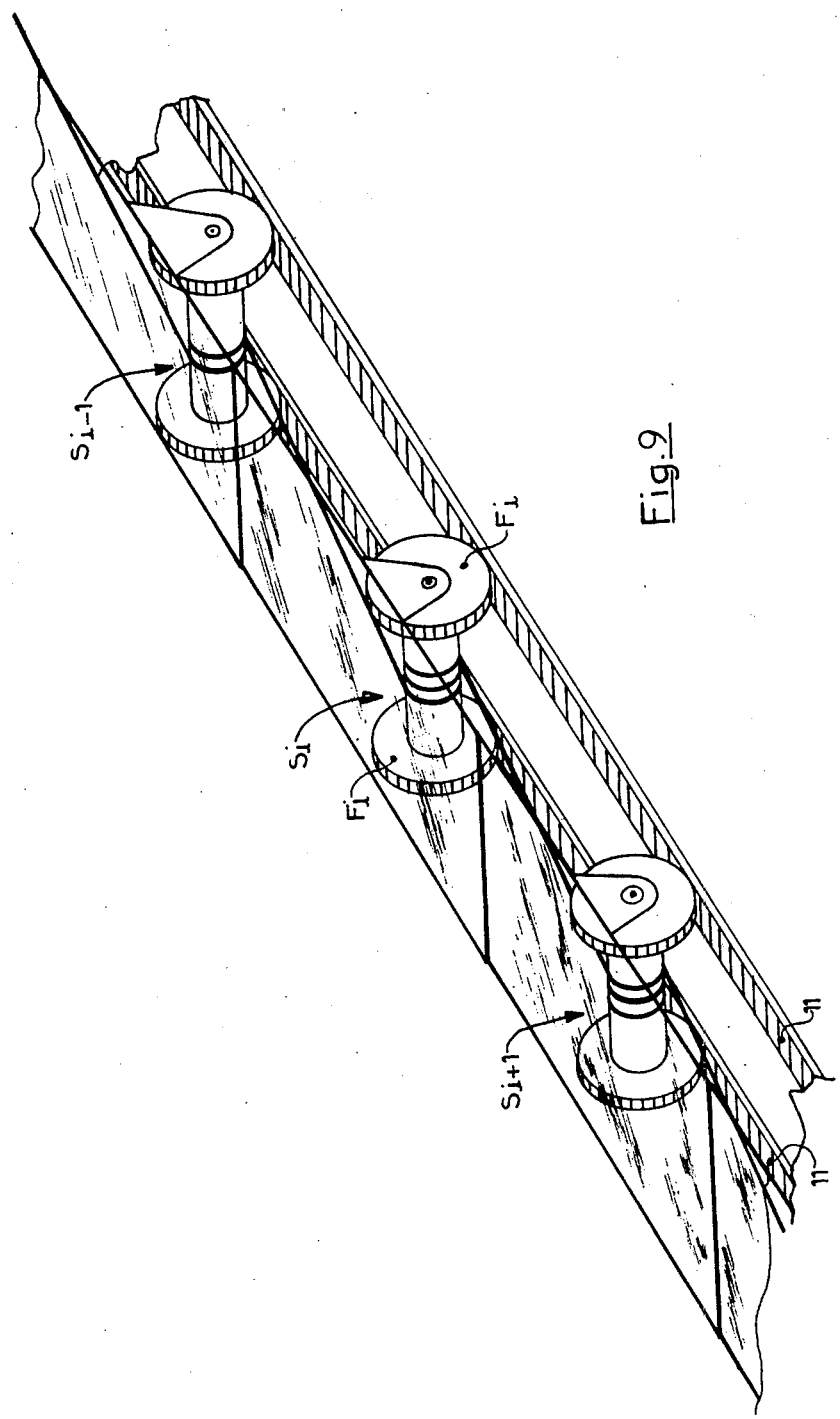
FIG. 9 is a perspective view of a modified embodiment wherein the longitudinal connecting bars are constituted by a flexible cable.

The second elements $B_i$ may be rigid, and can be constructed as actual bars (FIGS. 1, 2 and 3) or as reels with which the cross-bars $T_i$ are incorporated (FIG. 9).

Figure 10:
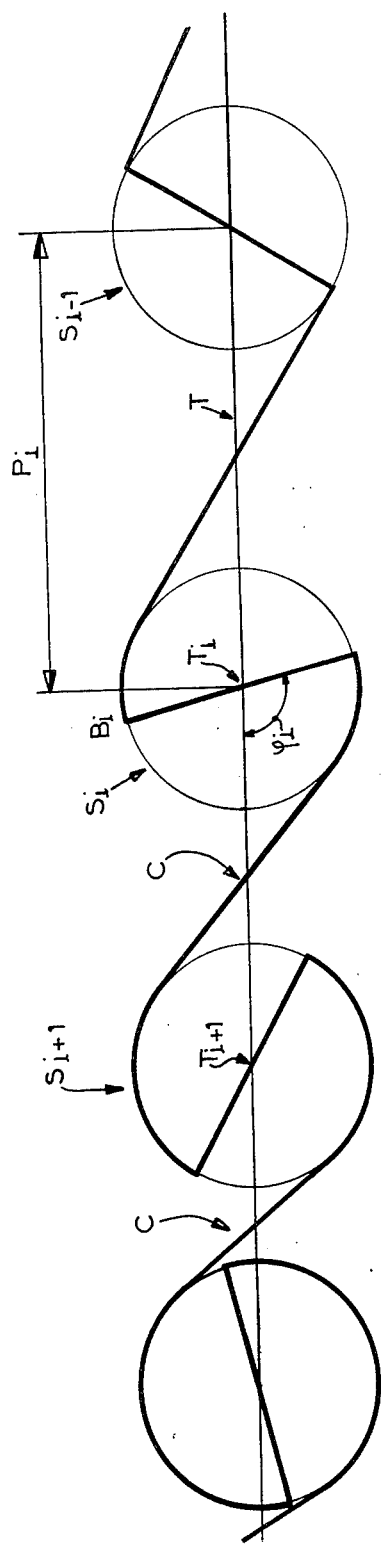
FIG. 10 is an explanatory diagram corresponding to the embodiment of FIG. 9.

The first means $L_i$ can either be rigid (FIGS. 1, 2 and 3) or flexible, being then constituted, for instance by cables (FIGS. 9 and 10).

It will thus be seen that the conveyor or chain includes on each of its sides an alternation of rocking bars $B_i$ and connecting bars $L_i$.

Each pair of bars $B_i$ can rock about the geometrical axis of the cross-bar $T_i$ with which it is integral. Such rocking brings about a variation of the angle $\phi$ between each rocking bar $B_i$ and the main path of travel or direction D in which the chain moves (FIG. 3).

It will be seen in FIG. 1 that the variations of said angle $\phi_i$, which decreases steadily on an upper side 3, and increases steadily on a lower side 4, lead or give rise to:

an increase in the pitch P from the pulley 2 to the pulley 1 on the side 3 (which causes an acceleration in the progress of the cross-bars $T_i$ in the direction of the arrow 5); and a decrease in the pitch P from the pulley 1 to the pulley 2 on the side 4 (which causes a deceleration in the progress of the cross-bars $T_j$ in the direction of the arrow 6).

Figure 2:
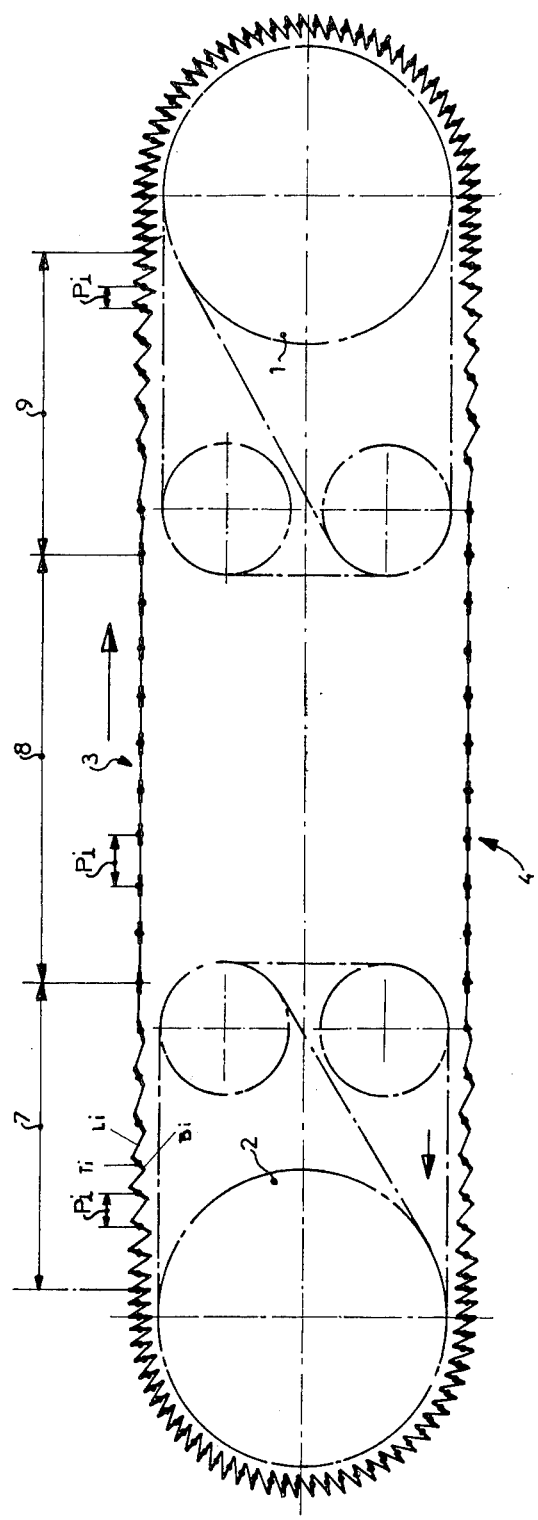
FIG. 2 shows a modified embodiment, wherein each side includes an accelerated zone and a retardated zone.

In the case of FIG. 2, on the contrary, the angle $\phi_i$ is made to decrease, remain constant, and then to increase, on a same side, such as 3, whereby, from the pulley 2 to the pulley 1, three successive zones are defined on said side 3, to wit:

an acceleration zone 7, wherein the angle $\phi$ decreases steadily due to the rocking bars $B_i$ being lowered, a zone 8 with a high constant speed, wherein the pitch $P_i$ is maximum, a deceleration zone 9, wherein the angle $\phi$ increases anew due to the rocking bars $B_i$ being raised, which brings about a reduction in the pitch $P_i$.

The reverse distribution appears on the other side 4 of the chain.

Figure 4:
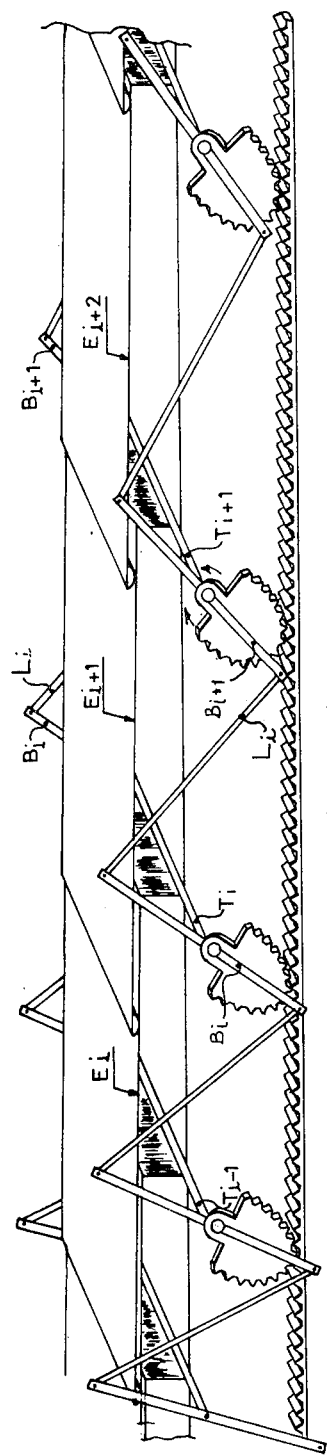
FIG. 4 is a corresponding view showing the disposition of the elements or plates of a transporting platform mounted on transverse bars of the chain, in a direction parallel to said transverse bars.

FIG. 4 shows a variable pitch chain according to the invention, each cross-bar $T_i$ being integral with a carrier member $E_i$ of the transporting platform, which member may be a carrying plate or a comb-carrying carriage. Said elements $E_i$ are parallel to the plane defined by the cross-bars $T_i$ of one side of the chain. They can, therefore, be used for defining a rectilinear carrying surface such as, for instance, a "mechanical footpath" for speeding up the pace of pedestrians. They can also constitute a handrail for such a device, since the variable pitch chain according to the invention can be wound and is well adapted to be reduced in size.

FIG. 5 shows, on the contrary, the diagrammatic arrangement of an accelerating-decelerating device operating as a roundabout, in order, for instance, to handle small packages. In this case, each carrying scale is perpendicular to that cross-bar $T_i$ with which it is integral.

Figure 7:
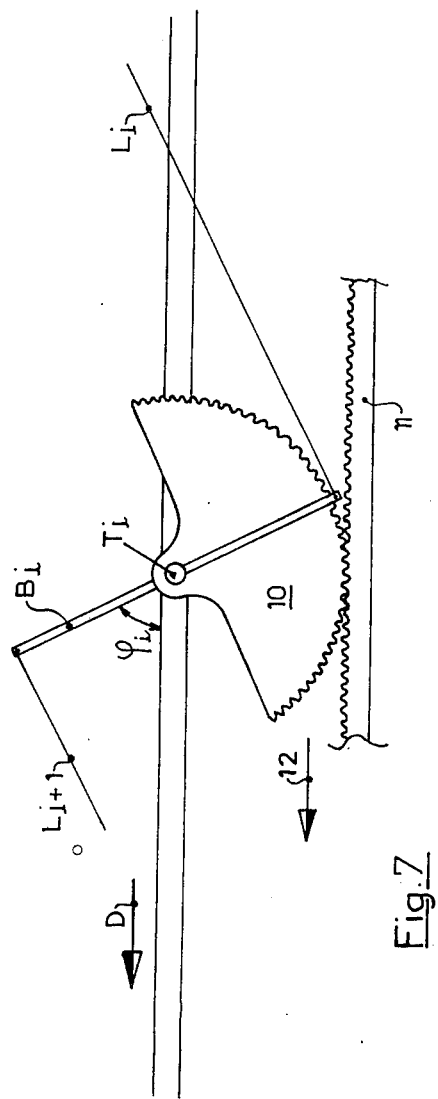
FIG. 7 shows a simple embodiment of the toothed sector control system for making the rocking bars rock, each bar being connected at both its ends to a longitudinal connecting bar.

The control of the rocking motion of the bars $B_i$ can be obtained as shown in FIGS. 4 and 7. Here, each pair of bars $B_i$ is integral with at least one toothed sector 10 in FIG. 7 or sector $10_i$ in FIG. 4 which meshes with a rack 11. The latter is parallel to the general direction D of travel of the variable pitch chain, and accompanies it during the motion thereof.

It will be seen that:

if the rack 11 travels more slowly than the chain, but in the same direction as the latter (arrow 12), the angle $\phi_i$ tends to decrease steadily, whereby the pitch $P_i$ of the chain is increased and the motion of said chain is accelerated locally;

if the rack 11 travels at the same speed as the chain, the angle $\phi_i$ remains constant, and so does the pitch $P_i$ of the chain;

if the rack 11 travels faster than the chain, the angle $\phi_i$ tends to increase steadily, which reduces the pitch $P_i$ and slows down locally the motions of the cross-bars $T_i$ and their associated members of the transporting platform, such as the comb-carrying carriages $E_i$.

Figure 8:
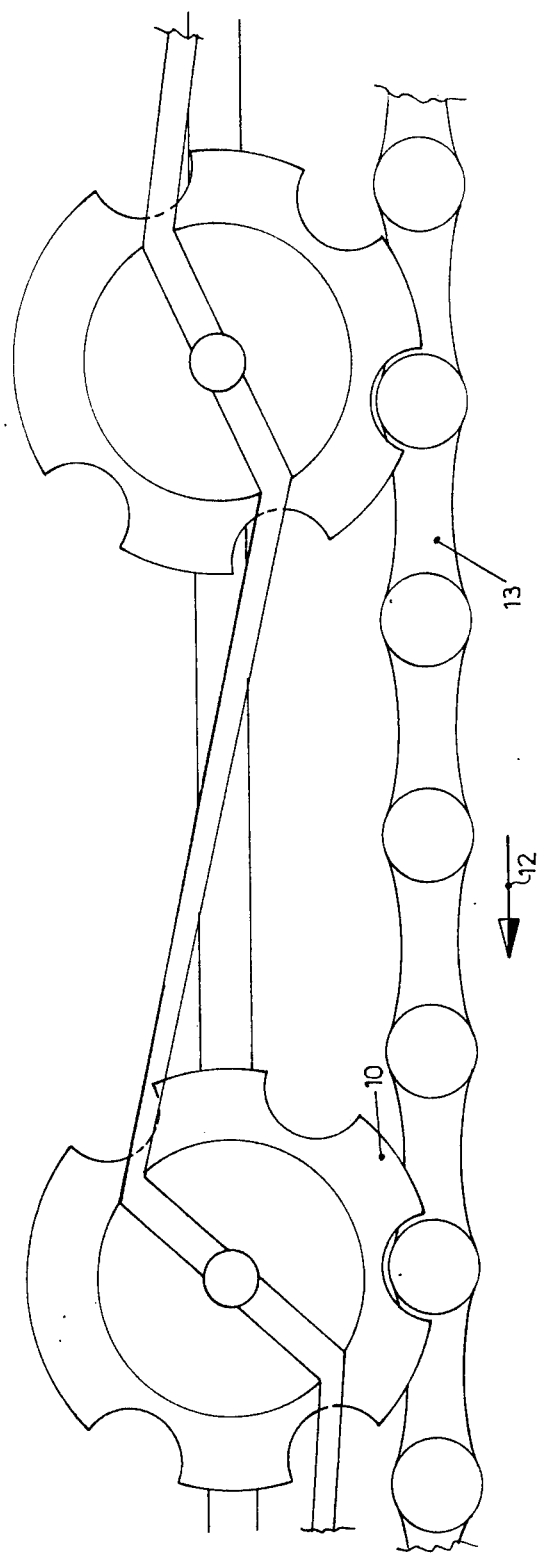
FIG. 8 shows a modified embodiment including a notched wheel.

Of course, the rack 11 may be replaced by an auxiliary chain 13 (FIG. 8) which is likewise able to travel (arrow 12) endlessly between two pulleys (not shown).

Equivalent arrangements could be obtained, of course, by starting no longer from the simplest link with a single connecting bar, but from the link with two connecting bars, as shown in FIG. 6.

FIG. 6 shows diagrammatically a more elaborate embodiment of the variable pitch chain according to the invention. Each cross-bar $T_i$ travels in a plane $yy'$. The associated rocking bar $B_i$ is linked through its center to said cross-bar, while each of its ends is linked to the adjacent end of a connecting bar $L_i$, $L'_i$. The first bar, $L_i$, is linked to the element $E_i$ of the transporting platform and to the preceding connecting bar $L'_{i-1}$. The second bar, $L'_i$, is likewise linked to $E_{i+1}$ and $L_{i+1}$. Each link includes thus:

one carrying plate which travels in the plane $xx'$,
two connecting bars,
one rocking bar,
one cross-bar which travels in the plane $yy'$, while the planes $xx'$ and $yy'$ are superposed to each other.

FIGS. 9 and 10 illustrate a modified embodiment wherein a cross-bar $T_i$ and its pair of rocking bars $B_i$ are embodied in and replaced by a solid body $S_i$ in the shape of a reel.

The first means takes the form of, or the connecting bars $L_i$ are replaced, by a cable or a chain which passes diametrally through each reel $S_i$ with which it is integral at at least one point, for instance, the center $T_i$ (FIG. 10). The cable C can wind to a variable extent on the barrel of each reel. Said angular position is defined by providing on the periphery of the cheeks $F_i$ (FIG. 9) of the reel a set of teeth which mesh with a rack 11 or 13 of the previously mentioned type. Hereagain, the disposition allows varying the pitch $P_i$ of the chain locally.

Figure 11:
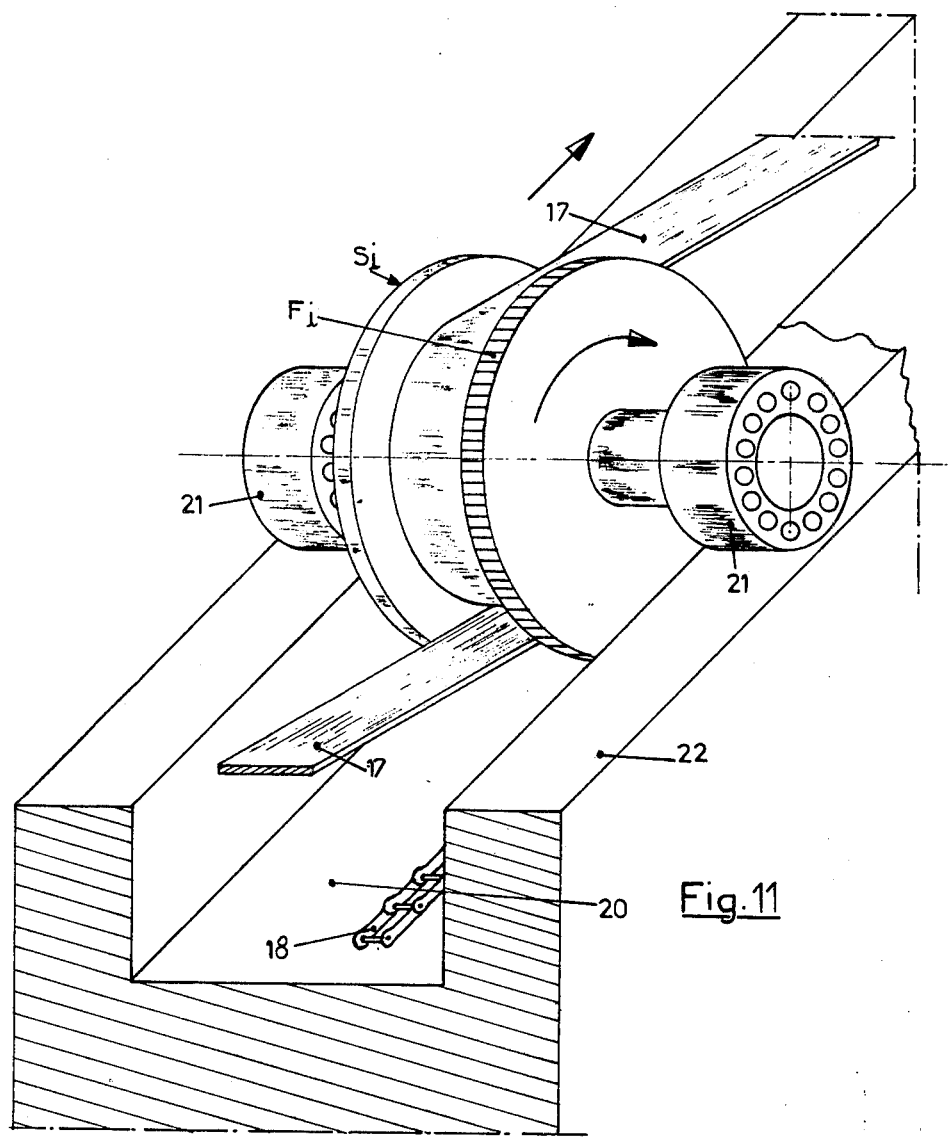
FIG. 11 illustrates a modification of FIG. 9, which includes only one auxiliary chain acting as a rack.

The modified embodiment illustrated in FIG. 11 includes a flexible and inextensible band 17 which winds to a variable extent on the reels $S_i$ to replace the connecting bars $L_i$. Each reel $S_i$ includes a single toothed cheek $F_i$ which meshes with a rack constituted by the auxiliary chain 18. The assembly moves inside a guiding groove 20, while each reel $S_i$ includes two side rollers 21 which run on fixed runways 22.

Figure 12:
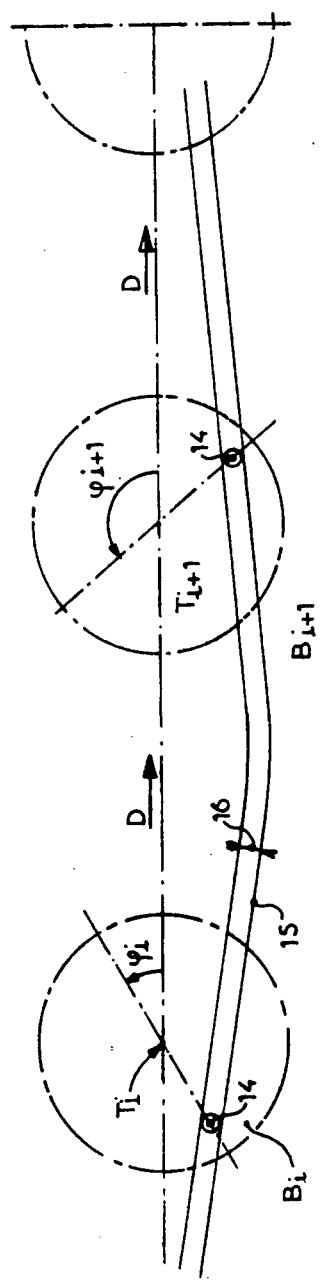
FIG. 12 shows a further embodiment of the control system for making the bars rock by means of transverse fingers sliding in shaped grooves or slideways.
Figure 13:
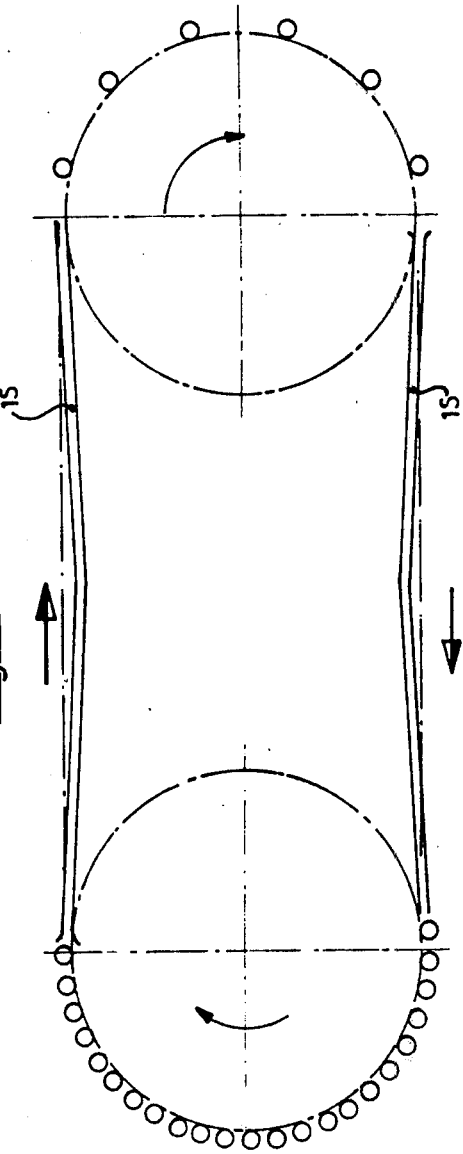
FIG. 13 shows the general disposition of an endless conveyor or chain equipped with the control system of FIG. 12.
Figure 20:
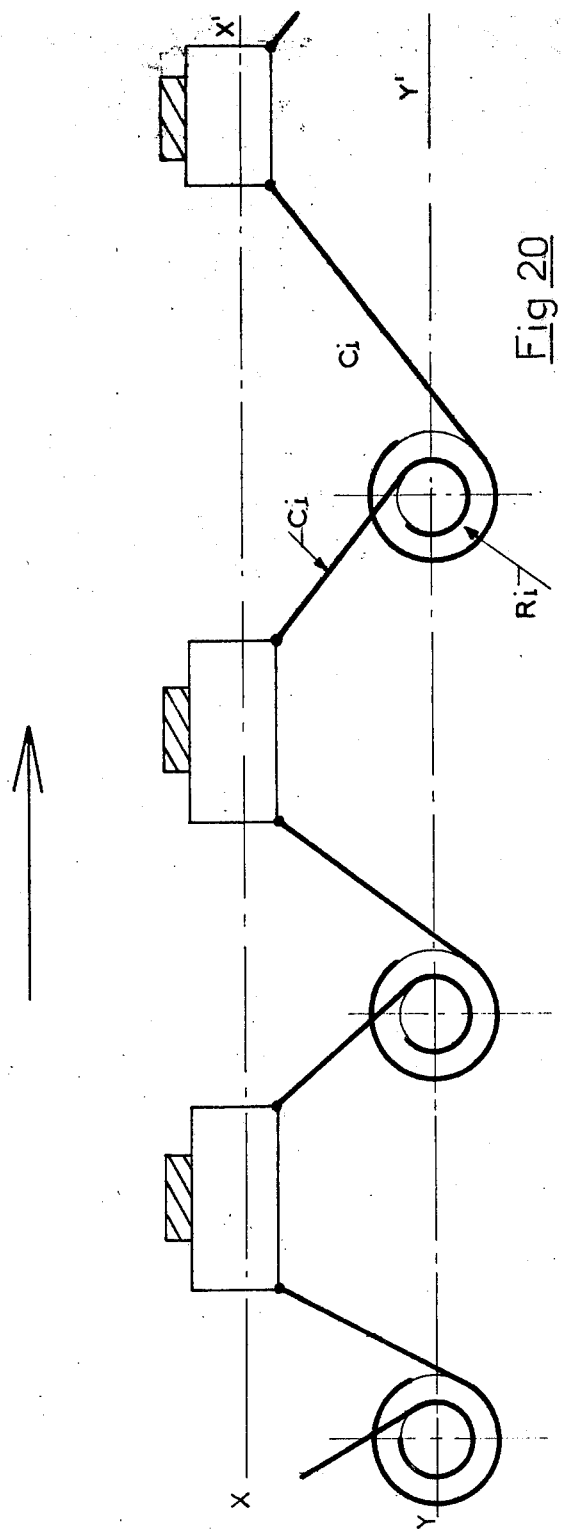
FIG. 20 shows a chain with reels and cables, wherein the unit links are constructed in two separate planes, according to the diagram of FIG. 6.

FIGS. 12 and 13 show another modified embodiment of the system for controlling the rocking motions of the reels $S_i$ or bars $B_i$. Here, the cheek $F_i$ of each reel $S_i$, or else the bar $B_i$ of each carrier member, is provided with a finger 14 which projects laterally in a direction parallel to the axis of the cross-bar $T_i$. Said finger slides inside a shaped slideway 15. Said slideway has a substantially constant width 16, but its length defines a sinusoidal path highly stretched out, which runs along the mean rectilinear path D of the cross-bars $T_i$.

It will be seen from FIG. 12 that this results in varying the angle $\phi$ which marks the angular orientation of each reel $S_i$.

FIG. 13 shows an arrangement with two slideways or fixed cams 15, which are used for achieving a result substantially similar to that already mentioned with reference to FIG. 1.

All the arrangements previously described could be constructed with links including two connecting bars, as shown in FIG. 6, instead of a single longitudinal connecting bar. Such a construction with two connecting bars is advantageous, in particular, owing to the fact that an essential feature of a chain, in particular when said chain is intended for speeding up devices for pedestrian movement, or handrails for such devices, is the ratio which exists between the greatest and the smallest length of the link of variable length. The higher this ratio, the greater the difference between the high speed and the low speed of the accelerating device. This is the reason why it is advantageous that the link it its condition of smallest extension should take up as little space as possible. It is obvious that this is the case in FIG. 6, since the chain is disposed in two superposed planes.

A few non-limiting examples will be given now of various ways of linking the chain according to the invention.

In all the following examples, the second element is of the roller or "reel" type, and the third element is flexible, inextensible and deformable. Said elements will be called hereinafter "reels" and "cables", respectively.

EXAMPLE 1

FIGS. 14 and 15

One of the two fixing points 30 and 31 for the cable $C_i$ is located on the reel $R_i$, and the other one is located on the strap $U_{i+1}$ carrying the next (or preceding) reel $R_{i+1}$.

The motion of rotation of the reel about its own axis can be obtained by any one of the means previously described, such as a rack or a finger sliding in a shaped slideway, or any other known means.

FIG. 15 illustrates a modified embodiment of this type of link having a single winding. While in FIG. 14 the taut side of the cable $C_i$ is parallel to the direction of the motion, in FIG. 15 said side is slanting, as the fixing point 32 is not on the same horizontal line as the starting portion 33 of the winding arc.

EXAMPLE 2

FIGS. 16 and 17

The arrangement of Example 1 is improved in that the cable $C_i$ has its fixing point fixed on the strap $U_i$ which carries the reel $R_i$ on which said cable winds. The reel of the preceding (or next) link carries a pulley $P_{i+1}$ on which the taut side of the cable is tied.

An improvement of the FIG. 16 arrangement is shown in FIG. 17, wherein said pulley or "tackle-block" is mounted at the end of an arm $B_i$ which carries a lateral finger, the engagement of said finger into an inclined slideway 34 varying the position of the center 35 of the "tackle-block" with respect to the plane of travel $xx'$.

EXAMPLE 3

FIGS. 18 and 19

These figures show that the reels or the windings can be unsymmetrical. The first end 36 of a cable $C_i$ is fixed to a first reel $R_i$ carried by the strap $U_i$. The second end 37 of the cable is fixed to the second reel $R'_{i+1}$ carried by the next (or preceding) strap. The cable $C_i$ winds through both its ends. Each strap $U_i$ of a link carries two reels $R_i$ and $R'_i$ on which the cable $C_i$ and the cable $C_{i-1}$ wind, respectively, in an unsymmetrical way. The taut side is either parallel to the direction of motion (FIG. 18), or inclined thereto (FIG. 19). Such an arrangement provides additional facilities when it is desired to program not only the speed but also the acceleration, or obtain a variation of the elongation depending on a pre-set law as a function of time.

EXAMPLE 4

FIG. 20

With the system including reels R and cables C, an example of the embodiment of the link in two planes has been obtained, which is similar to that illustrated in FIG. 6. The elements of the transporting platform (not shown) travel in the upper plane $xx'$. The winding reel or reels $R_i$ corresponding to rocking bars travel in the lower plane $yy'$. For each link the connection is performed through two cables $C_i$ and $C'_i$.

EXAMPLE 5

FIGS. 21 and 22

It is clear that the conveyor or chain with links of variable length according to the invention can be used in conjunction two or more of the improvements described in the Examples 1, 2 and 3.

This is shown in FIGS. 21 and 22. In FIG. 21, for instance, one of the reels R is replaced by a bogie $V_i$ of two reels R and $R_i$ symmetrically disposed with respect to the direction of travel.

In this case, the two ends 38 and 39 of the cable $C_i$ of a link are fixed on one of the two pulleys $R_i$ and $R'_i$ of the bogie, while the taut side winds around a loose pulley 40 on the axis of the next (or preceding) bogie $V_{i+1}$.

In FIG. 22, each link includes a bogie of two pulleys $R_i$ and $R'_i$ which may have unequal radii. The two ends 41 and 42 of the cable $C_i$ are fixed on the upstream pulley $R_i$ of a bogie and the downstream pulley $R'_{i+1}$ of the next bogie, respectively, while the taut side is tied on a loose pulley 43 disposed at the end of the rocking arm 44.

We claim:

1. A variable-pitch chain-like conveyor, comprising, in combination:
   a series of first transverse elements which move in a plane substantially parallel to a main path of travel and each of which is disposed substantially perpendicular to said main path of travel;
   a series of second longitudinal elements each of which is movably connected through its central portion to one end of at least one of said first elements;
   a series of third longitudinal elements, each of which interconnects directly one of said second elements to its adjacent second element in said series of second elements; and
   means operably and mechanically connected to said series of second elements for varying the orientation of said second elements during movement of said conveyor.

2. A conveyor according to claim 1, wherein:
   said first elements comprise transverse bars disposed between two longitudinal rows of articulated second elements;
   said second elements comprise longitudinal rocking bars, each of which is linked through its central portion to a transverse bar, to which it is perpendicular;
   said series of third longitudinal elements comprises longitudinal connecting bars, each of which has a first end linked to the adjacent end of a first rocking bar; and
   said means operably and mechanically connected to said series of second elements varies the orientation of at least one pair of longitudinal rocking bars during said movement of said conveyor.

3. A conveyor according to claim 2, wherein a second end of each longitudinal connecting bar is linked to the adjacent end of a second rocking bar.

4. A conveyor according to claim 2, wherein said first end of each longitudinal connecting bar is linked to the adjacent end of a rocking bar, and each said transverse bar is connected to an element of a transporting platform.

5. A conveyor with links of variable length according to claim 2 wherein:
   each said link includes one said rocking bar and two said connecting bars; and
   said transverse bars and the axes of rotation of said rocking bars travel in two superposed planes in order to reduce the space taken up by any said link at the time the latter is in its condition of smallest extension.

6. A conveyor according to claim 5, wherein the conveyor runs endlessly between two end pulleys, and thus defines an up-chain side and a down-chain side, and wherein said second means creates zones of acceleration and deceleration.

7. A conveyor according to claim 6, wherein said end pulleys define two chain sides, one of which is accelerated by a progressive increase in the length of the links, while the other one is decelerated by a progressive decrease in the length of the links.

8. A conveyor according to claim 6, characterized in that it runs endlessly between two end pulleys, whereby two chain sides are defined, each of which has at least one zone accelerated by an increase in the length of the links, and at least one zone decelerated by a reduction in the length of the links.

9. A conveyor according to claim 2, wherein said means for varying the orientation of the rocking bars includes at least one toothed sector for each pair of rocking bars, which sector is integral with said pair, and at least one auxiliary endless chain with ordinary links, the links of said auxiliary chain defining a rack with which the toothed sectors of the rocking bars of the corresponding portion of the main chain mesh.

10. A conveyor according to claim 9, characterized in that one side of the auxiliary endless chain constitutes a rack which travels in a direction parallel to said main path of travel of said conveyor, but at a speed which differs from the mean local speed of said conveyor.

11. A conveyor according to claim 2, wherein said means for varying the orientation of the rocking bars include on every pair of rocking bars at least one finger which projects laterally and travels inside a slideway, the lengthwise shape of which is substantially that of a sinusoid stretched out along said main path of travel of said conveyor.

12. A conveyor according to claim 1, characterized in that each said second element is rigid.

13. A conveyor according to claim 1, wherein said series of third longitudinal elements comprises a plurality of rigid elements which are linked to said second elements with which they alternate.

14. A conveyor according to claim 1, wherein said series of third longitudinal elements comprises a plurality of rigid elements which are linked to said second elements and each said first transverse element is connected to elements of a transporting platform.

15. A conveyor according to claim 1, wherein said series of third longitudinal elements comprises flexible and inextensible funicular members.

16. A conveyor according to claim 1, wherein each said first element is integral with a carrying plate, the major plane of which is parallel to that of said first element, the successive plates overlapping one another in part, and being able to slide over one another to define a wound transporting chain.

17. A conveyor according to claim 1, wherein each said first element is integral with a carrying plate, the major plane of which is perpendicular to that of said first element, the successive plates overlapping one another in part, and being able to slide over one another to define a transporting chain which operates as a roundabout.

18. A variable-pitch chain-like conveyor, comprising, in combination:
   a series of first elements which move substantially parallel to a main path of travel and which are disposed substantially transverse to said main path of travel;
   a series of second elements each of which is movably connected through its central portion to at least one of said first elements, respectively;
   first means interconnecting each said second element to adjacent second elements in said series of second elements;
   second means operably and mechanically connected to said series of second elements for varying the orientation of said second elements during movement of said conveyor; and
   wherein said first means comprises flexible, deformable and inextensible third elements, and wherein said first elements are cylindrical in section and carry fixing points for ends of said third elements.

19. A conveyor according to claim 18, wherein each of said links includes one of said flexible third elements and one of said first elements which is cylindrical in section.

20. A conveyor according to claim 19, wherein said cylindrical first element is imparted a motion of rotation about its own axis upon the motion of the conveyor, said rotation causing said flexible third element to selectively wind and unwind, causing said link to be selectively shortened and extended, respectively.

21. A conveyor according to claim 20, wherein said motion of rotation of said first element and the winding of said third element are produced by said second means for varying the orientation of said second elements.

22. A conveyor according to claim 18, wherein said flexible third element has a fixing point on a strap which carries said cylindrical first element on which said third element winds, while the other end of said third element is fixed to a pulley carried by said cylindrical first element of the preceding link.

23. A conveyor according to claim 18, wherein each of said links includes two flexible third elements and one cylindrical first element.

24. A conveyor according to claim 23, characterized in that said first elements and the windings of said flexible first elements are unsymmetrically arranged.

25. A conveyor with links of variable length according to claim 1, wherein: each said link includes at least one first element and at least one second element; and wherein said link, when in its condition of smallest extension, takes up as little space as possible.

* * * * *